(12) United States Patent
Yasuda et al.

(10) Patent No.: US 11,697,402 B2
(45) Date of Patent: Jul. 11, 2023

(54) WORK VEHICLE

(71) Applicant: Kubota Corporation, Osaka (JP)

(72) Inventors: Toshifumi Yasuda, Sakai (JP); Akihiro Takami, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 17/744,989

(22) Filed: May 16, 2022

(65) Prior Publication Data

US 2023/0076775 A1  Mar. 9, 2023

(30) Foreign Application Priority Data

Sep. 7, 2021  (JP) ................................. 2021-145614

(51) Int. Cl.
| | |
|---|---|
| *B60T 1/00* | (2006.01) |
| *F16H 48/24* | (2006.01) |
| *F16H 63/34* | (2006.01) |
| *F16H 48/30* | (2012.01) |
| *F16H 63/30* | (2006.01) |

(52) U.S. Cl.
CPC .............. *B60T 1/005* (2013.01); *F16H 48/24* (2013.01); *F16H 63/3416* (2013.01); *F16H 63/345* (2013.01); *F16H 2048/305* (2013.01); *F16H 2063/3089* (2013.01)

(58) Field of Classification Search
CPC ............... F16H 48/24; F16H 2048/305; F16H 63/3408–3416; F16H 63/345; F16H 2063/3089; B60T 1/005
See application file for complete search history.

(56) References Cited

U.S. PATENT DOCUMENTS

| | | | | |
|---|---|---|---|---|
| 7,192,376 | B2 * | 3/2007 | Ishii ........................ | F16D 39/00 475/237 |
| 8,056,697 | B2 * | 11/2011 | Eley ....................... | B60W 10/16 475/237 |
| 8,845,474 | B2 * | 9/2014 | Kochidomari ......... | B60K 23/08 475/202 |
| 8,986,152 | B2 * | 3/2015 | Sato ........................ | F16H 48/20 475/237 |
| 9,279,488 | B2 * | 3/2016 | Ishino .................... | B60K 17/08 |
| 11,156,282 | B2 * | 10/2021 | Hisaoka ................ | B60T 8/3215 |
| 2014/0274542 | A1 * | 9/2014 | Schroeder ............... | F16H 48/24 475/231 |

FOREIGN PATENT DOCUMENTS

| | | | |
|---|---|---|---|
| JP | H07125558 | A  * | 5/1995 |
| JP | 200967080 | A | 4/2009 |
| JP | 2012117605 | A  * | 6/2012 |

\* cited by examiner

*Primary Examiner* — Ernesto A Suarez
*Assistant Examiner* — James J Taylor, II
(74) *Attorney, Agent, or Firm* — The Webb Law Firm

(57) ABSTRACT

A diff-lock operation shaft 50 is supported by a case 11 in such a manner as to be rotatable around an axis P1 of the diff-lock operation shaft 50 and operates a diff-lock section 48 to a lock position A2 by being rotated, and a first coil spring 51 is wound around the outer surface of the diff-lock operation shaft 50 concentrically with the diff-lock operation shaft 50, and is linked at one end portion 51*b* to the diff-lock operation shaft 50 and at another end portion 51*a* to linking members 55 and 56. The first coil spring 51 is twisted around the axis P1 via the linking members 55 and 56 by the manual operation tool 58 being operated, and the diff-lock operation shaft 50 is rotated via the first coil spring 51.

4 Claims, 8 Drawing Sheets

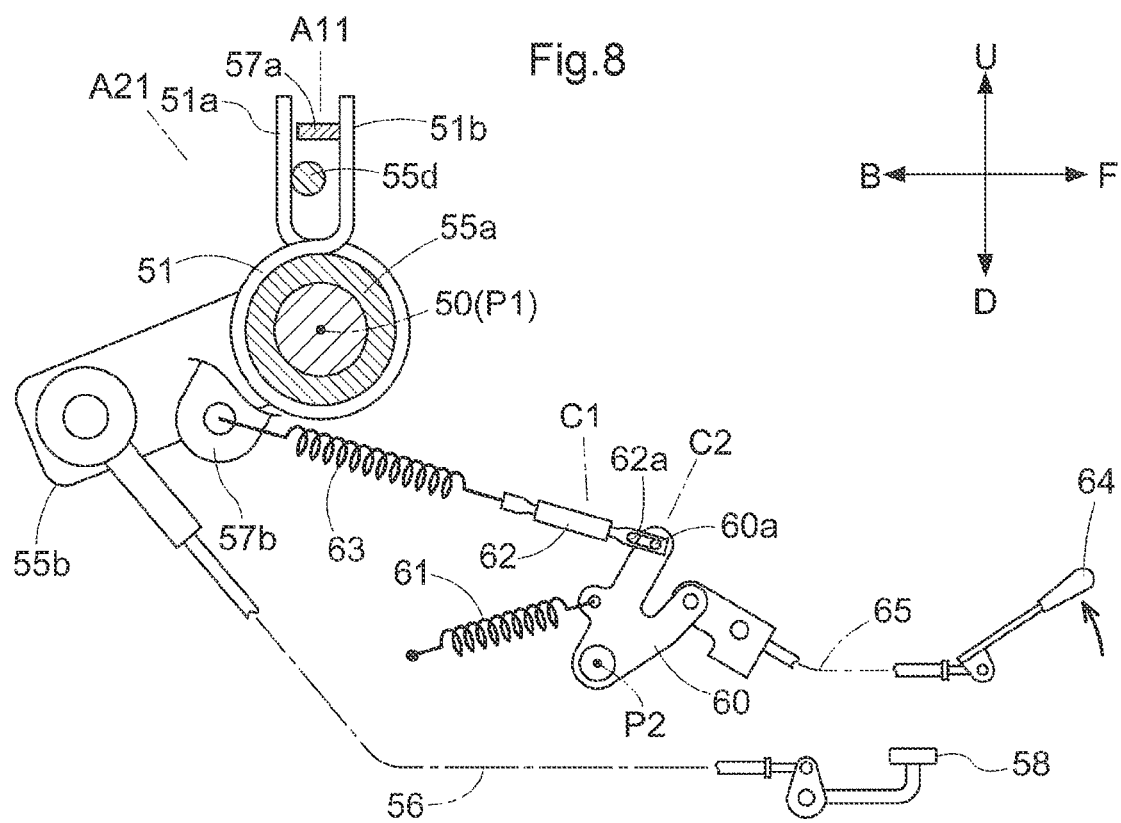
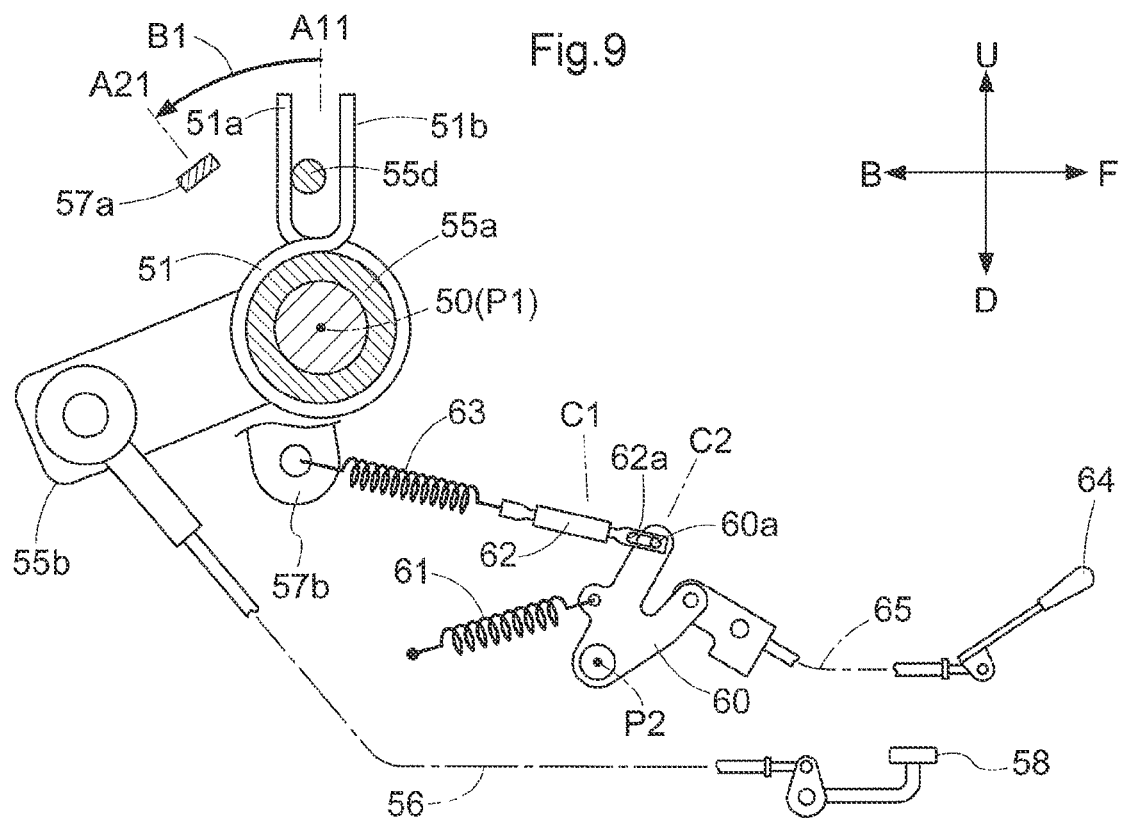

னWORK VEHICLE

CROSS-REFERENCE TO RELATED APPLICATION

This application claims priority to Japanese Patent Application No. 2021-145614 filed Sep. 7, 2021, the disclosure of which is hereby incorporated by reference in its entirety.

BACKGROUND OF THE INVENTION

1. Field of the Invention

The present invention relates to the configuration of a travel system in a work vehicle.

2. Description of the Related Art

A work vehicle disclosed in Patent Document 1 (JP 2009-67080A (see FIGS. 8 and 10)) includes a differential that distributes power to right and left rear wheels and a diff-lock section operable to an operating position in which the differential is operational and a diff-lock position in which the differential is locked.

In Patent Document 1, the diff-lock section is a mesh-type (dog clutch) diff-lock section that meshes with a differential case of the differential and thereby locks the differential (diff-lock position).

To mesh, the mesh-type diff-lock section needs to be in phase with the portion to be meshed with. In the case where the diff-lock section is operated to the diff-lock position by a manual operation tool such as an operation lever, the manual operation tool is thus often connected to the diff-lock section via a coil tension spring.

In the above configuration, if, in the case where the manual operation tool is operated to operate the diff-lock section to the diff-lock position, the diff-lock section is out of phase with the portion to be meshed with and cannot be operated to the diff-lock position, the tension spring is extended and stores spring force. Then, when the diff-lock section becomes in phase with the portion to be meshed with, the diff-lock section is operated to the diff-lock position by the spring force of the tension spring, and the differential is locked.

Patent Document 1: JP 2009-67080A (see FIGS. 8 and 10)

In the case where the diff-lock section is connected to the differential via a coil tension spring in a configuration in which the diff-lock section is operated to the diff-lock position by a manual operation tool, the tension spring is relatively long and required a large space, thus possibly leading to difficulty disposing the tension spring.

An object of the present invention is to compactly constitute an operation system for operating a diff-lock section that operates a differential to an operational state and a locked state in a work vehicle.

SUMMARY OF THE INVENTION

A work vehicle of the present invention includes right and left travel devices, a differential configured to distribute power from a motor section to the right and left travel devices, a diff-lock section operable to an operating position in which the differential is operational and a diff-lock position in which the differential is locked, a diff-lock device configured to operate the diff-lock section to the operating position and the diff-lock position, a case housing the differential, the diff-lock section and the diff-lock device, a manual operation tool configured to be manually operated, and a linking member connected between the diff-lock device and the manual operation tool. The diff-lock device includes a diff-lock operation shaft supported by the case in such a manner as to be rotatable around an axis of the diff-lock operation shaft, and configured to operate the diff-lock section to the diff-lock position by being rotated, and a first coil spring wound around an outer surface of the diff-lock operation shaft concentrically with the diff-lock operation shaft, and linked at one end portion to the diff-lock operation shaft and at another end portion to the linking member. Due to the manual operation tool being operated, the first coil spring is twisted around the axis via the linking member, and the diff-lock operation shaft is rotated via the first coil spring.

According to the present invention, a first coil spring is wound around the outer surface of a diff-lock operation shaft for operating a diff-lock section, one end portion of the first coil spring is linked to the diff-lock operation shaft, and a linking member (manual operation tool) is linked to the other end portion of the first coil spring.

In response to the manual operation tool being operated in order to operate the differential to a locked state, the diff-lock operation shaft is rotated via the first coil spring, and the diff-lock section is operated to a diff-lock position by the diff-lock operation shaft, thus locking the differential.

According to the present invention, when the diff-lock section cannot be operated to the diff-lock position (when the diff-lock operation shaft cannot be rotated) due to the diff-lock section being out of phase with the portion to be meshed with, the first coil spring is twisted, on the outer surface of the diff-lock operation shaft, around an axis by the linking member (manual operation tool), and stores spring force.

Then, when the diff-lock section becomes in phase with the portion to be meshed with, the diff-lock operation shaft is rotated by the spring force of the first coil spring and the diff-lock section is operated to the diff-lock position, thus locking the differential.

According to the present invention, the first coil spring is attached by being wound around the outer surface of the diff-lock operation shaft, thus allowing the first coil spring to be disposed without difficulty due to eliminating the need for a large space for disposing the first coil spring. The operation system (linking member, first coil spring, etc.) for operating the diff-lock operation shaft can thereby be constituted compactly.

In the present invention, it is preferable that the first coil spring is wound around the outer surface of a portion of the diff-lock operation shaft protruding externally from the case, and the one end portion and the other end portion of the first coil spring are respectively linked to the diff-lock operation shaft and the linking member, outside the case.

According to the present invention, the first coil spring is wound around the outer surface of a portion of the diff-lock operation shaft protruding externally from the case, thus allowing a configuration in which one end portion of the first coil spring is linked to the diff-lock operation shaft and the other end portion of the first coil spring is linked to the linking member to be easily realized outside the case, without interference from the differential or the like.

In the present invention, it is preferable that the work vehicle further includes a manually operable diff-lock operation tool, a parking brake provided in a transmission system from the motor section to the differential, and a brake operation tool configured to operate the parking brake to a braking state by being manually operated, one of the diff-lock operation tool and the brake operation tool is linked, via a flexible spring, to the portion of the diff-lock operation shaft protruding externally from the case, and the diff-lock operation shaft is rotated via the flexible spring by the one of the diff-lock operation tool and the brake operation tool being operated, and another of the diff-lock operation tool and the brake operation tool is the manual operation tool.

The work vehicle may be provided with a parking brake in the transmission system from the motor section to the differential. In such a work vehicle, the differential needs to be operated to a locked state, in addition to the parking brake being operated to a braking state.

In the work vehicle, the diff-lock operation tool for operating the differential to the locked state when the work vehicle is traveling normally is provided separately from the brake operation tool.

In a work vehicle such as described above, it is assumed that the diff-lock operation tool is linked to the diff-lock operation shaft via the flexible spring, and the brake operation tool is linked to the diff-lock operation shaft via the first coil spring.

According to the present invention, if the diff-lock section is out of phase with the portion to be meshed with when the diff-lock operation tool is operated, the flexible spring stores spring force, and when the diff-lock section becomes in phase with the section to be meshed with, the diff-lock operation shaft is rotated by the spring force of the flexible spring, and the differential is locked.

In response to the brake operation tool being operated, the diff-lock operation shaft is rotated by the aforementioned function of the first coil spring and the differential is locked, in addition to the parking brake being operated to the braking state.

In a work vehicle such as described above, it is assumed that the brake operation tool is linked to the diff-lock operation shaft via the flexible spring, and the diff-lock operation tool is linked to the diff-lock operation shaft via the first coil spring.

According to the present invention, in response to the brake operation tool being operated, the diff-lock operation shaft is rotated by the aforementioned function of the flexible spring and the differential is locked, in addition to the parking brake being operated to the braking state.

In response to the diff-lock operation tool being operated, the diff-lock operation shaft is rotated by the aforementioned function of the first coil spring, and the differential is locked.

According to the present invention, in the case where the diff-lock operation tool and the brake operation tool are provided, the diff-lock operation shaft is rotated without difficulty through operation of the diff-lock operation tool and operation of the brake operation tool, and the differential is locked.

According to the present invention, the diff-lock operation tool and the brake operation tool are linked to the portion of the diff-lock operation shaft protruding externally from the case, via the first coil spring and the flexible spring, thus allowing the operation system of the diff-lock operation tool and the operation system of the brake operation tool to be constituted compactly.

In the present invention, it is preferable that in at least one of a portion where the one end portion of the first coil spring is linked to the diff-lock operation shaft and a portion where the other end portion of the first coil spring is linked to the linking member, the linked sections become separated from each other in response to the diff-lock operation shaft being rotated by the one of the diff-lock operation tool and the brake operation tool being operated.

According to the present invention, in response to one of the diff-lock operation tool and the brake operating tool being operated and the diff-lock operation shaft being rotated via the flexible spring, the linked sections in the portion where one end portion of the first coil spring is linked to the diff-lock operation shaft (portion where other end portion of first coil spring is linked to linking member) separate from each other, and thus the first coil spring is not twisted. The first coil spring thereby does not act as resistance to the operation of the one of the diff-lock operation tool and the brake operation tool.

According to the present invention, the first coil spring does not act as resistance in the case where one of the diff-lock operation tool and the brake operation tool is operated, and thus the one of the diff-lock operation tool and the brake operation tool is not heavy to operate and has good operability.

In the present invention, it is preferable that the diff-lock operation shaft extends to one of left and right sides and to another of the left and right sides with respect to a left-right center of the differential, and a portion of the diff-lock operation shaft on the one of the left and right sides and a portion of the diff-lock operation shaft on the other of the left and right sides are rotatably supported by the case.

According to the present invention, disposing the diff-lock operation shaft to extend to one of the left and right sides and to the other of the left and right sides of the differential with respect to the left-right center of the differential allows the diff-lock operation shaft to rotate smoothly, due to the diff-lock operation shaft being relatively long and both the left and right sides of the diff-lock operation shaft being supported by the case.

In the present invention, it is preferable that the diff-lock device includes a fork section attached to the portion of the diff-lock operation shaft on the one of the left and right sides in such a manner as to be movable along the axis, and engaging with the diff-lock section, a cam section configured to, in response to the diff-lock operation shaft being rotated, transmit the rotation of the diff-lock operation shaft to the fork section and move the fork section such that the diff-lock section is operated to the diff-lock position, and a second coil spring wound around the outer surface of the diff-lock operation shaft concentrically with the diff-lock operation shaft to span from the fork section to the portion on the other of the left and right sides of the diff-lock operation shaft, and biasing the fork section such that the diff-lock section is operated to the operating position.

According to the present invention, in the case where the diff-lock device includes a fork section and a cam section, the fork section is moved by the cam section in response to the diff-lock operation shaft being rotated, and the diff-lock section is operated to the diff-lock position. In this case, a second coil spring for biasing the fork section such that the diff-lock section is operated to the operating position may be provided.

According to the present invention, the second coil spring is wound around the outer surface of the diff-lock operation shaft to span from the fork section that is attached to a portion of the diff-lock operation shaft on one of the left and right sides to a portion of the diff-lock operation shaft on the other of the left and right sides.

Because the second coil spring is thereby relatively long, the operation of the second coil spring for operating the diff-lock section to the operating position via the fork section is stabilized.

BRIEF DESCRIPTION OF THE DRAWINGS

FIG. 8 is a right-side view showing a state in which the parking brake lever is operated from the state shown in FIG. 5.

FIG. 9 is a right-side view showing a state in which the parking brake lever is operated from the state shown in FIG. 5.

DETAILED DESCRIPTION OF PREFERRED EMBODIMENTS

Figure 1:
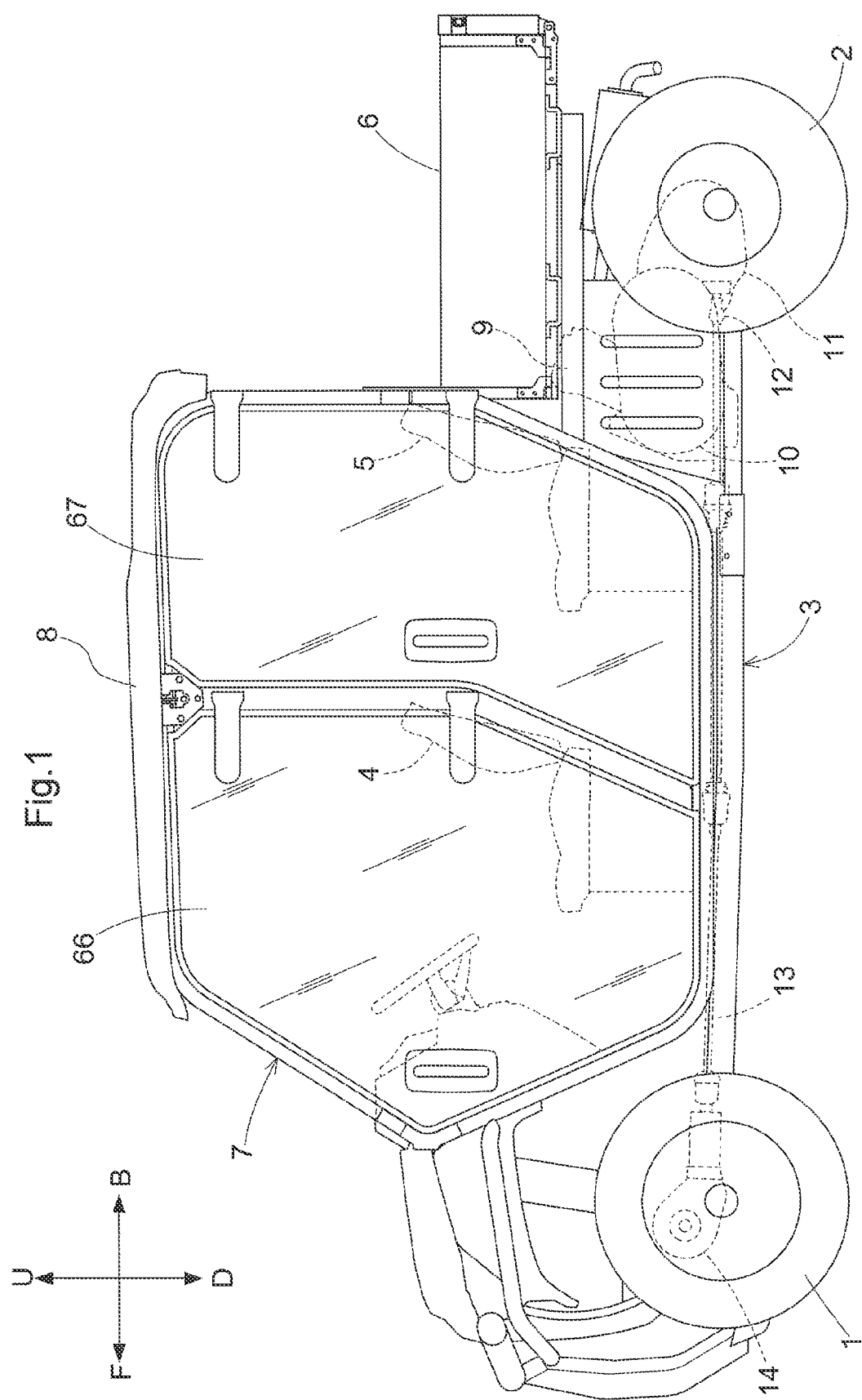
FIG. 1 is a left side view of a work vehicle.

FIGS. 1 to 10 show a multipurpose work vehicle, with F, B, U, D, R and L in FIGS. 1 to 10 respectively indicting forward, backward, upward, downward, right, and left directions Overall Configuration of Work Vehicle As shown in FIG. 1, a body 3 is supported by right and left front wheels 1 and right and left rear wheels 2 (correspond to travel device). The body 3 is provided with right and left front seats 4, right and left back seats 5, and a cargo bed 6 on the back side of the back seats 5.

A ROPS frame 7 covering the front seats 4 and back seats 5 is provided. A front windshield (not shown) is provided in the front section of the ROPS frame 7, a rear windshield (not shown) is provided in the back section of the ROPS frame 7, and a roof 8 is provided in an upper section of the ROPS frame 7. Right and left front doors 66 are provided in right and left sections of the front section of the ROPS frame 7, and right and left rear doors 67 are provided in right and left sections of the back section of the ROPS frame 7.

Summary of Travel Transmission System

Figure 2:
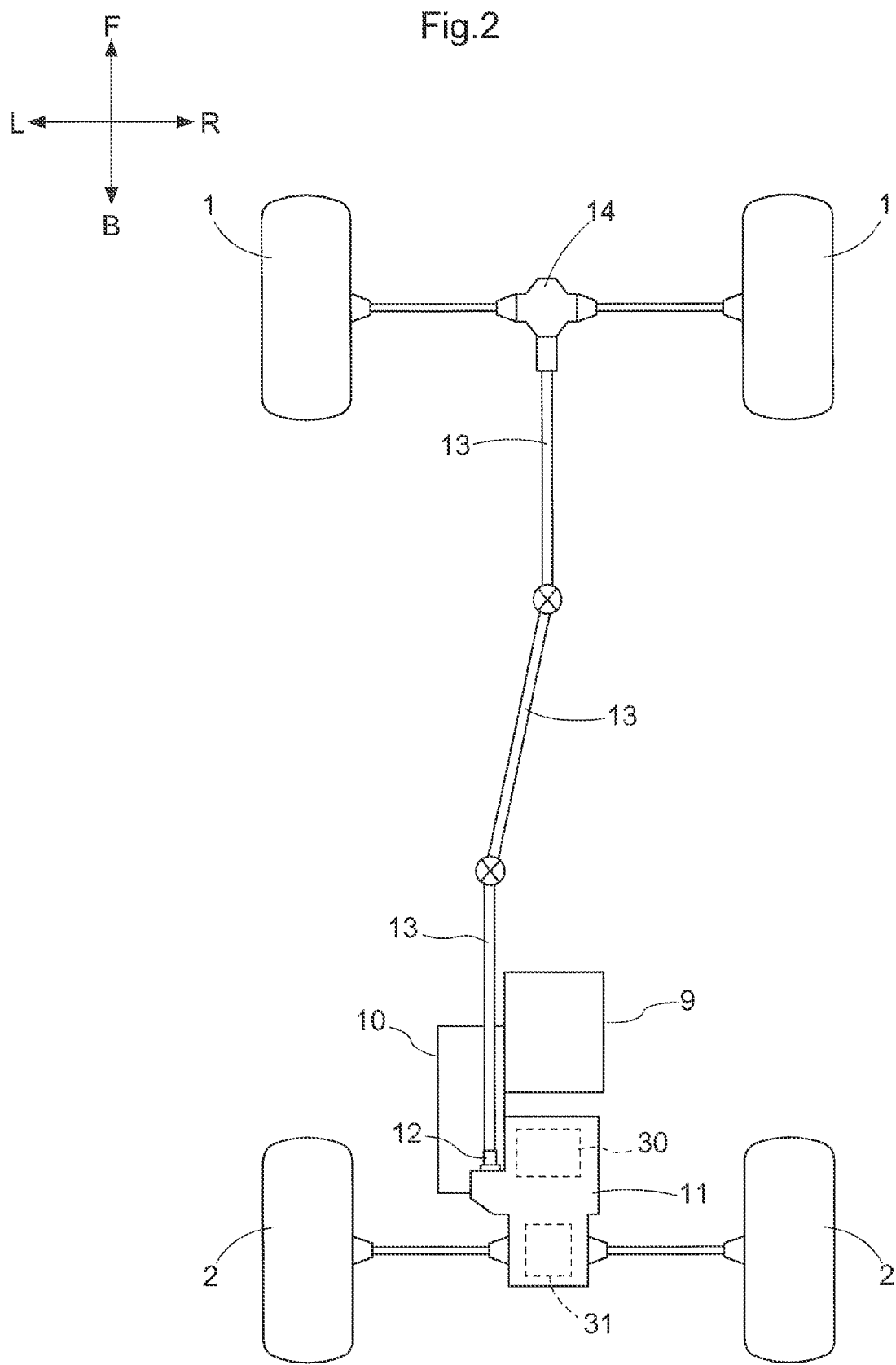
FIG. 2 is a schematic view showing a transmission system to front and rear wheels.

As shown in FIGS. 1 and 2, an engine 9 (corresponds to motor section), a belt-type stepless transmission 10, and a transmission case 11 (corresponds to case) are supported by the back section of the body 3.

Power from the engine 9 is transmitted to the stepless transmission 10, and power from the stepless transmission 10 is transmitted to an auxiliary transmission 30 housed in the transmission case 11. Power from the auxiliary transmission 30 is distributed to the right and left rear wheels 2, via a rear wheel differential 31 (corresponds to differential) housed in the transmission case 11.

An output shaft 12 is provided in the transmission case 11, and power branched immediately before the rear wheel differential 31 is distributed from the output shaft 12 to the right and left front wheels 1, via a transmission shaft 13 and a front wheel differential 14.

Configuration of Auxiliary Transmission

Figure 3:
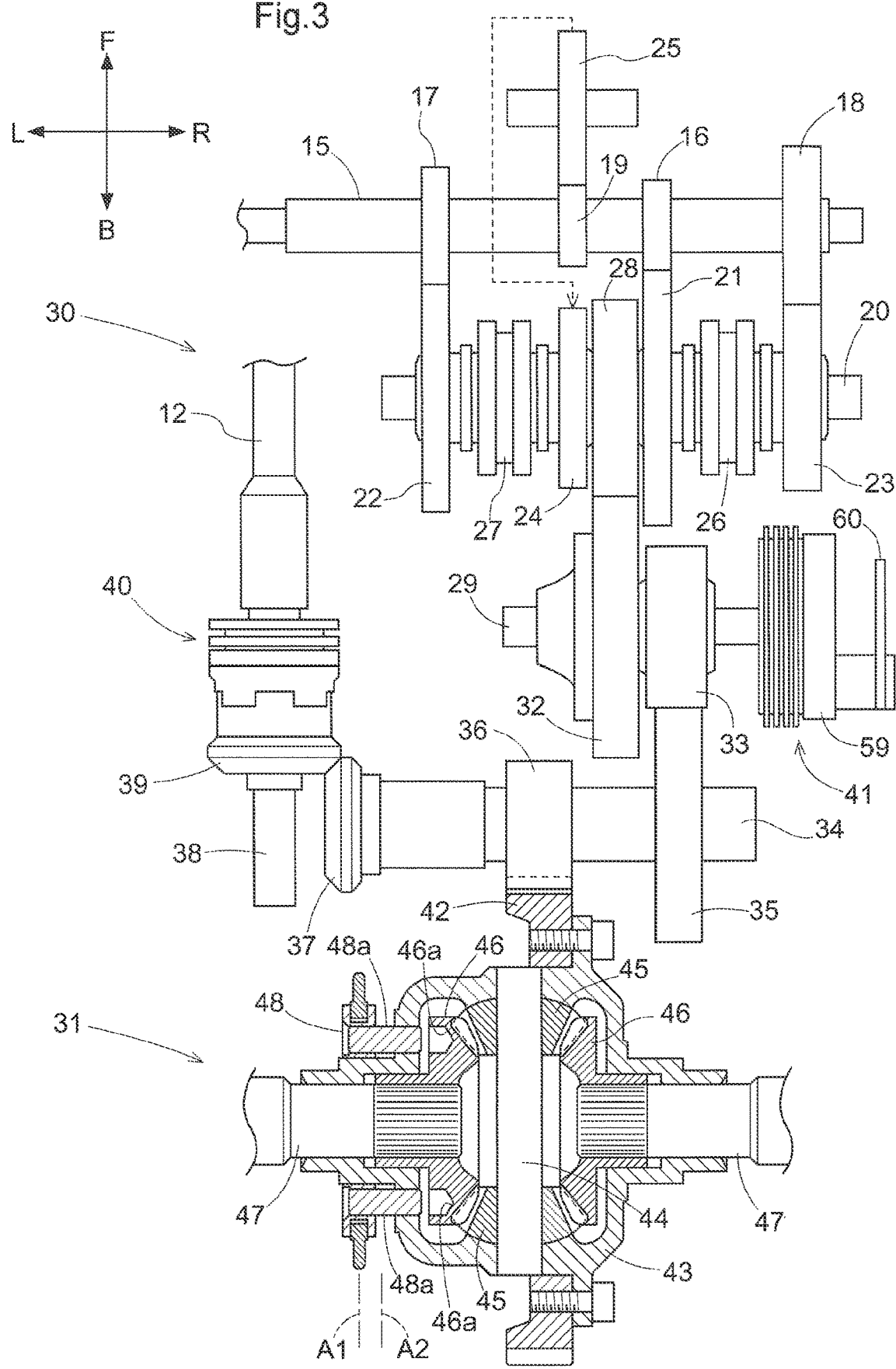
FIG. 3 is a lateral section plan view of a vicinity of an auxiliary transmission, a parking brake and a rear wheel differential in a transmission case.

As shown in FIGS. 2 and 3, an input shaft 15 is supported in the left-right direction by the front section of the transmission case 11, and power from the stepless transmission 10 is transmitted to the input shaft 15. A low gear 16, a medium gear 17, a high gear 18 and a reverse gear 19 are coupled to the input shaft 15.

A transmission shaft 20 is supported in the left-right direction by the transmission case 11, and transmission gears 21, 22 and 23 are rotatably attached to the transmission shaft 20, and a transmission gear 28 is coupled to the transmission shaft 20.

The transmission gears 21, 22, and 23 are meshed with the low gear 16, the medium gear 17 and the high gear 18. A relay gear 25 is supported by the transmission case 11, the reverse gear 19 is meshed with the relay gear 25, and the relay gear 25 is meshed with a transmission gear 24 that is rotatably attached to the transmission shaft 20.

Shift members 26 and 27 are attached to the transmission shaft 20 in such a manner as to be rotatable and slidable as one. When the shift member 26 is meshed with the transmission gear 21, power from the input shaft 15 is transmitted to the transmission shaft 20, via the low gear 16 and the transmission gear 21 (low speed state). When the shift member 27 is meshed with the transmission gear 22, power from the input shaft 15 is transmitted to the transmission shaft 20, via the medium gear 17 and the transmission gear 22 (medium speed state).

When the shift member 26 is meshed with the transmission gear 23, power from the input shaft 15 is transmitted to the transmission shaft 20, via the high gear 18 and the transmission gear 23 (high speed state). When the shift member 27 is meshed with the transmission gear 24, power from the input shaft 15 is transmitted to the transmission shaft 20 in reverse, via the reverse gear 19, the relay gear 25 and the transmission gear 24.

As described above, the auxiliary transmission 30 shifts power that is transmitted to the transmission shaft 20 to one of three forward speeds and one reverse speed.

Configuration of transmission system from auxiliary transmission to front and rear wheels As shown in FIGS. 2 and 3, a transmission shaft 29 is supported in the left-right direction by the transmission case 11, and transmission gears 32 and 33 are coupled to the transmission shaft 29. The transmission gear 32 is meshed with the transmission gear 28, and power from the transmission shaft 20 (auxiliary transmission 30) is transmitted to the transmission shaft 29 via the transmission gears 28 and 32.

A transmission shaft 34 is supported in the left-right direction by the transmission case 11, and transmission gears 35 and 36 and a bevel gear 37 are coupled to the transmission shaft 34. The transmission gear 35 is meshed with the transmission gear 33, and power from the transmission shaft 29 is transmitted to the transmission shaft 34 via the transmission gears 33 and 35.

A transmission shaft 38 is supported by the transmission case 11 in the front-back direction concentrically with the output shaft 12, and a bevel gear 39 coupled to the transmission shaft 38 is meshed with the bevel gear 37. A mesh-type (dog clutch) front wheel transmission clutch 40 is provided between the transmission shaft 38 and the output shaft 12.

Power from the transmission shaft 34 is transmitted to the output shaft 12, via the bevel gears 37 and 39, the transmission shaft 38 and the front wheel transmission clutch 40, and is transmitted from the output shaft 12 to the front wheels 1 via the transmission shaft 13 and the front wheel differential 14. When the front wheel transmission clutch 40 is disengaged, power to the front wheels 1 is shut off.

The rear wheel differential 31 is supported in the left-right direction by the transmission case 11, an input gear 42 of the rear wheel differential 31 is meshed with the transmission gear 36, and power from the transmission shaft 34 is transmitted to the rear wheel 2 via the rear wheel differential 31.

A front brake (not shown) is provided on the right and left front wheels 1, and a rear brake (not shown) is provided on the right and left rear wheels 2.

A friction multi-plate parking brake 41 is provided on the transmission shaft 29, and the parking brake 41 is provided in the transmission system from the engine 9 (motor section) to the rear wheel differential 31 (differential).

Configuration of Rear Wheel Differential

As shown in FIG. 3, the rear wheel differential 31 includes a casing 43, the input gear 42, a support pin 44, a pair of bevel gears 45 and a pair of bevel gears 46.

The casing 43 is supported by the transmission case 11 in such a manner as to be rotatable around an axis extending in the left-right direction, and the input gear 42 is coupled to an outer peripheral section of the casing 43. The support pin 44 is supported inside the casing 43, and the pair of bevel gears 45 are rotatably supported by the support pin 44.

The pair of bevel gears 46 are supported inside the casing 43 in such a manner as to be rotatable around the axis extending in the left-right direction, and the bevel gears 45 are meshed with the bevel gears 46. Right and left output shafts 47 are supported in the left-right direction by the transmission case 11, and inserted into the casing 43, and the output shafts 47 is coupled to the bevel gears 46.

Configuration of Differential-Lock Section (Diff-Lock Section)

As shown in FIG. 3, a ring-shaped diff-lock section 48 is attached to a left section of the casing 43 in such a manner as to be movable in the left-right direction and is housed in the transmission case 11. A plurality of rod-shaped meshing sections 48a are coupled to the diff-lock section 48, the meshing sections 48a are inserted into an opening in the left section of the casing 43, and the diff-lock section 48 rotates as one with the casing 43.

In the rear wheel differential 31, a plurality of recessed sections 46a are provided on a back surface of the left bevel gear 46.

In the state shown in FIG. 3, the diff-lock section 48 is operated to an operating position A1, and the meshing sections 48a of the diff-lock section 48 are separated leftward from the recessed sections 46a of the bevel gears 46. In this state, the rear wheel differential 31 is operational.

In response to the diff-lock section 48 being operated rightward to a lock position A2, the meshing sections 48a of the diff-lock section 48 are inserted into the recessed sections 46a of the bevel gears 46, and the casing 43 is coupled to the bevel gears 46. In this state, the rear wheel differential 31 is locked.

Summary of Differential-Lock Device (Diff-Lock Device) for Operating Diff-Lock Section to Operating Position and Differential-Lock Position (Diff-Lock Position)

Figure 4:
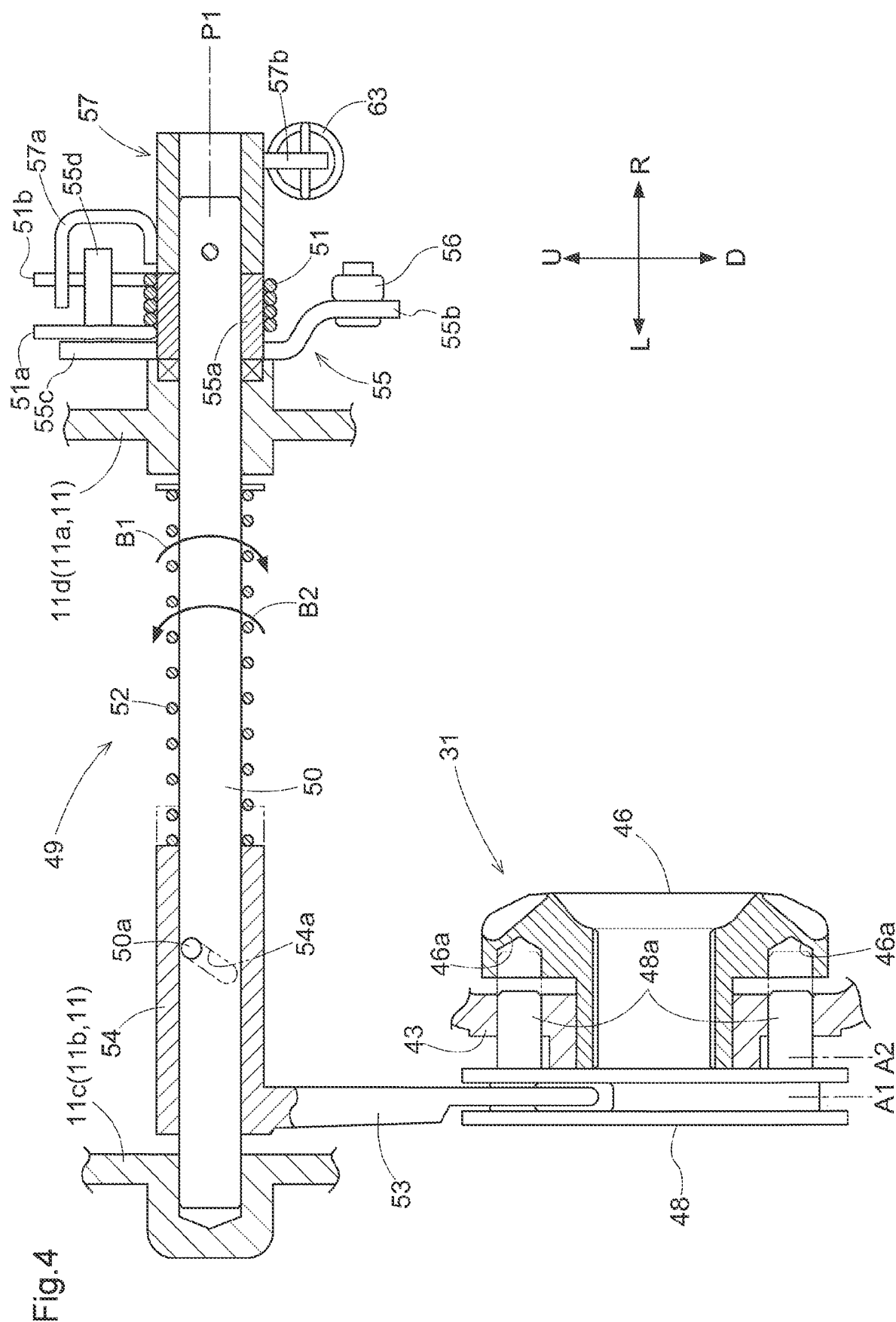
FIG. 4 is a longitudinal section rear view in a vicinity of a diff-lock device and a diff-lock section in the transmission case.

As shown in FIG. 4, a diff-lock device 49 has a diff-lock operation shaft 50, a first coil spring 51, a second coil spring 52, a fork section 53, and a boss section 54, and the diff-lock operation shaft 50, the second coil spring 52, the fork section 53 and the boss section 54 are housed in the transmission case 11.

Configuration of Diff-Lock Operation Shaft, Fork Section and Second Coil Spring

As shown in FIG. 4, the transmission case 11 is divided into a right portion 11a and a left portion 11b. A left section of the diff-lock operation shaft 50 (corresponding to "portion on one of left and right sides") is supported by a bearing 11c of the left portion lib of the transmission case 11, and a right section of the diff-lock operation shaft 50 (corresponding to "portion on other of left and right sides") is supported by a bearing 11d of the right portion 11a of the transmission case 11.

Inside the transmission case 11, the diff-lock operation shaft 50 is thereby disposed in the left-right direction to extend to the one of the left and right sides and to the other of the left and right sides with respect to the left-right center of the rear wheel differential 31, upward of the rear wheel differential 31. The diff-lock operation shaft 50 is supported by the transmission case 11 in such a manner as to be rotatable around its own axis P1 extending in the left-right direction.

Inside the transmission case 11, the boss section 54 is attached to a left section of the diff-lock operation shaft 50 in such a manner as to be movable along the axis P1, and the fork section 53 is coupled to the boss section 54 and engages the diff-lock section 48. The fork section 53 is thereby attached to the left section (corresponds to portion on one of left and right sides) of the diff-lock operation shaft 50 in such a manner as to be movable along the axis P1.

The boss section 54 has a long hole 54a (corresponds to cam section) inclined relative to the axis P1, and a pin 50a coupled to the diff-lock operation shaft 50 is inserted into the long hole 54a of the boss section 54.

The second coil spring 52 is wound around the outer surface of the diff-lock operation shaft 50 concentrically with the diff-lock operation shaft 50 to span from the fork section 53 and boss section 54 to the bearing 11d of the right portion 11a of the transmission case 11 (corresponds to portion on other of left and right sides of diff-lock operation shaft 50). The fork section 53 and the boss section 54 are biased leftward by the second coil spring 52, and the diff-lock section 48 is biased to the operating position A1.

In the state shown in FIG. 4, the fork section 53 and the boss section 54 are pushed leftward by the biasing force of the second coil spring 52 and the diff-lock section 48 is operated to the operating position A1 by the fork section 53, and the diff-lock operation shaft 50 is rotated in a second direction B2 by cam action of the pin 50a of the diff-lock operation shaft 50 and the long hole 54a of the boss section 54.

In response to the diff-lock operation shaft 50 being rotated in a first direction B1, the rotation of the diff-lock operation shaft 50 is transmitted to the fork section 53 and the boss section 54 by the cam action of the pin 50a of the diff-lock operation shaft 50 and the long hole 54a of the boss section 54. The fork section 53 and the boss section 54 are moved rightward against the biasing force of the second coil spring 52, and the diff-lock section 48 is operated to the lock position A2 by the fork section 53.

Figure 5:
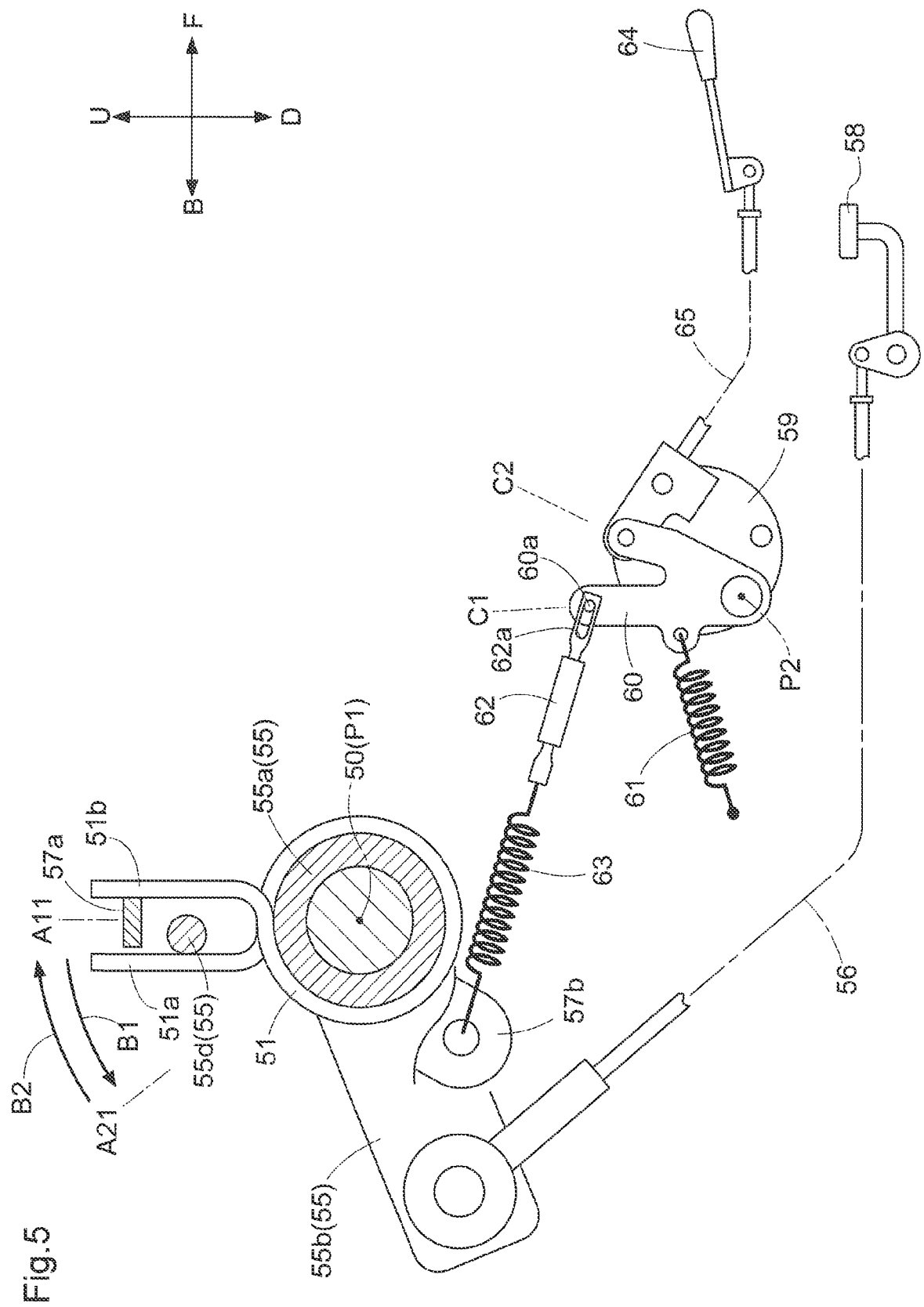
FIG. 5 is a right-side view showing a linked state of a diff-lock operation shaft with a diff-lock pedal and a parking brake lever.

Configuration Relating to Linkage of Diff-Lock Operation Shaft and Diff-Lock Pedal As shown in FIGS. 4 and 5, a boss section 57 is coupled to an end portion of a portion of the diff-lock operation shaft 50 protruding externally from the transmission case 11, and a linking member 55 is rotatably attached to the diff-lock operation shaft 50 between the transmission case 11 and the boss section 57.

The linking member 55 includes a boss section 55a rotatably attached to the diff-lock operation shaft 50, a pair of arms 55b and 55c coupled to the boss section 55a, and a horizontal pin-shaped abutting section 55d coupled to the arm 55c.

The first coil spring 51 is wound around the outer surface of the boss section 55a of the linking member 55, and the first coil spring 51 is wound around the outer surface of the portion of the diff-lock operation shaft 50 protruding externally from the transmission case 11 concentrically with the diff-lock operation shaft 50.

An end portion 51a of the first coil spring 51 abuts the abutting section 55d of the linking member 55 from the back. A channel-shaped receiving section 57a is coupled to the boss section 57, and an end portion 51b of the first coil spring 51 abuts the receiving section 57a of the boss section 57 from the front.

In the body 3 (see FIG. 1), a diff-lock pedal 58 (corresponds to diff-lock operation tool/manual operation tool) that is manually foot-operated is provided in a vicinity of the foot of the front seats 4 (see FIG. 1), and a wire 56 (corresponds to linking member) is connected between the diff lock pedal 58 and the arm 55b of the linking member 55. In response to the diff-lock pedal 58 being foot-operated, the wire 56 is pulled toward the diff-lock pedal 58, and the diff-lock pedal 58 can be held in the operated state.

The linking member 55 and the wire 56 are thereby linked to span from the diff-lock operation shaft 50 to the diff-lock pedal 58. Outside the transmission case 11, the end portion 51b of the first coil spring 51 and the diff-lock operation shaft 50 are linked via the boss section 57 (receiving section 57a), and the end portion 51a of the first coil spring 51 and the linking member 55 (abutting section 55d) are linked.

The linked sections in the portion where the one end portion 51b of the first coil spring 51 and the diff-lock operation shaft 50 (end portion 51b of the first coil spring 51 and receiving section 57a of the boss section 57) are linked and the linked sections in the portion where the other end portion 51a of the first coil spring 51 and the linking member 55 (end portion 51a of first coil spring 51 and abutting section 55d of linking member 55) are linked separably abut each other.

Configuration Relating to Linkage of Diff-Lock Operation Shaft and Parking Brake Lever As shown in FIGS. 4 and 5, a brake cam 59 for operating the parking brake 41 (see FIG. 3) is provided in a right section of the parking brake 41, and a brake operation section 60 is swingably supported around an axis P2 extending in the left-right direction. The brake operation section 60 is operable to a release position C1 and a braking position C2 around the axis P2, and is biased to the release position C1 by a spring 61.

In the state shown in FIG. 5, the brake operation section 60 is in the release position C1, and the parking brake 41 is released. In response to the brake operation section 60 being operated to the braking position C2, the brake cam 59 is operated by the brake operation section 60, and the parking brake 41 is operated to a braking state by the brake cam 59.

As shown in FIGS. 4 and 5, an arm 57b is coupled to the boss section 57, and a third coil spring 63 (corresponds to flexible spring) is connected to the arm 57b of the boss section 57. An adjustable-length linking rod 62 is connected to the third coil spring 63, and a pin 60a of the brake operation section 60 is inserted into a long hole-shaped flexible section 62a provided on the linking rod 62.

In the body 3 (see FIG. 1), a manually operable parking brake lever 64 (corresponds to brake operation tool/manual operation tool) is provided in a vicinity of the front seats 4 (see FIG. 1), and a wire 65 is connected between the parking brake lever 64 and the brake operation section 60. In response to the parking brake lever 64 being operated, the wire 65 is pulled toward the parking brake lever 64, and the parking brake lever 64 can be held in the operated state.

Operation of Diff-Lock Operation Shaft by Diff-Lock Pedal

As described above in "Configuration of diff-lock section" and "Configuration of diff-lock operation shaft, fork section and second coil spring", in a state where the diff-lock section 48 is operated to the operating position A1, the diff-lock operation shaft 50 and the linking member 55 are in an operating rotation position A11 corresponding to the operating position A1, as shown in FIGS. 4 and 5.

Figure 6:
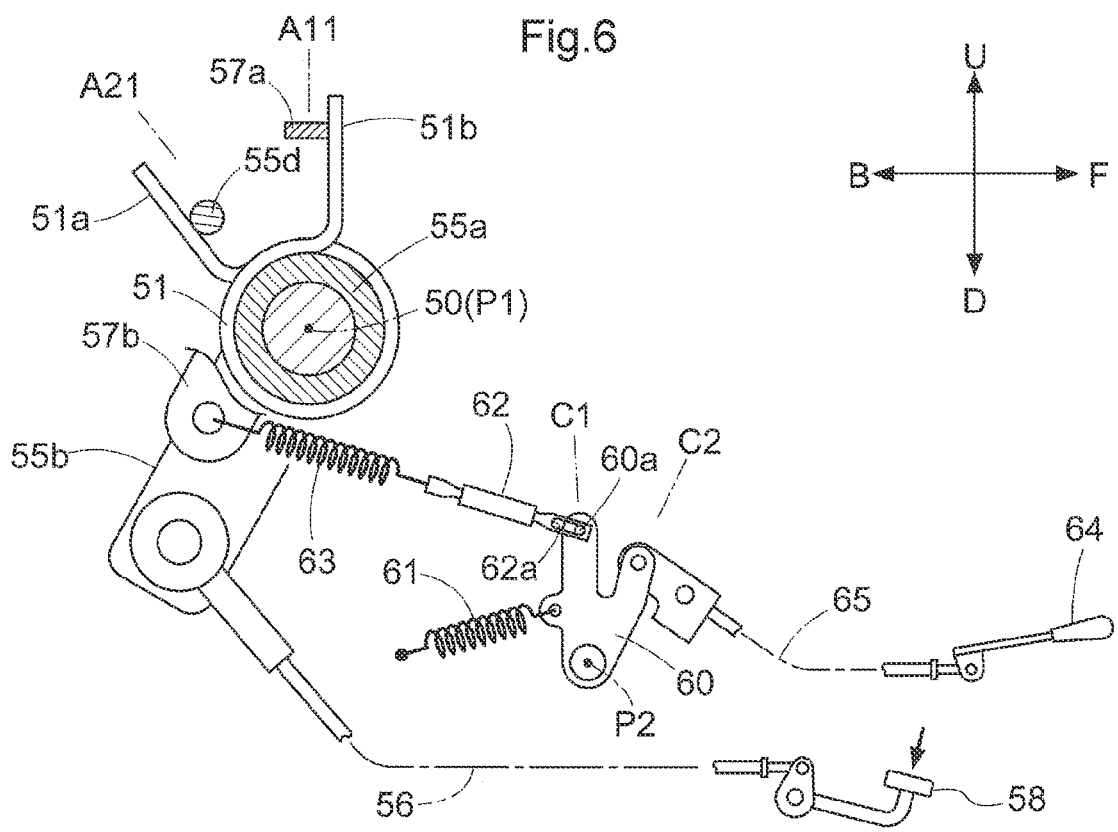
FIG. 6 is a right-side view showing a state in which the diff-lock pedal is foot-operated from the state shown in FIG. 5.

In response to the diff-lock pedal 58 being foot-operated, as shown from FIG. 4 to FIG. 6, in a state where the diff-lock section 48 is in the operating position A1, the wire 56 is pulled toward the diff-lock pedal 58 and the linking member 55 is rotated in the first direction B1 to a lock rotation position A21, and the end portion 51a of the first coil spring 51 is rotated to the lock rotation position A21, by the abutting section 55d of the linking member 55.

In this case, as shown in FIG. 4 and described above in "Configuration of rear wheel differential", when the meshing sections 48a of the diff-lock section 48 cannot be inserted into the recessed sections 46a of the bevel gears 46 (diff-lock section 48 cannot be operated to lock position A2) due to the meshing sections 48a of the diff-lock section 48 being out of phase with the recessed sections 46a of the bevel gears 46, the diff-lock operation shaft 50 (receiving section 57a of boss section 57 and end portion 51b of first coil spring 51) is kept at the operating rotation position A11, as shown in FIG. 6.

In response, the end portion 51a of the first coil spring 51 is rotated to the lock rotation position A21 by the abutting section 55d of the linking member 55, resulting in the first coil spring 51 being twisted, as shown in FIG. 6, and storing spring force.

Figure 7:
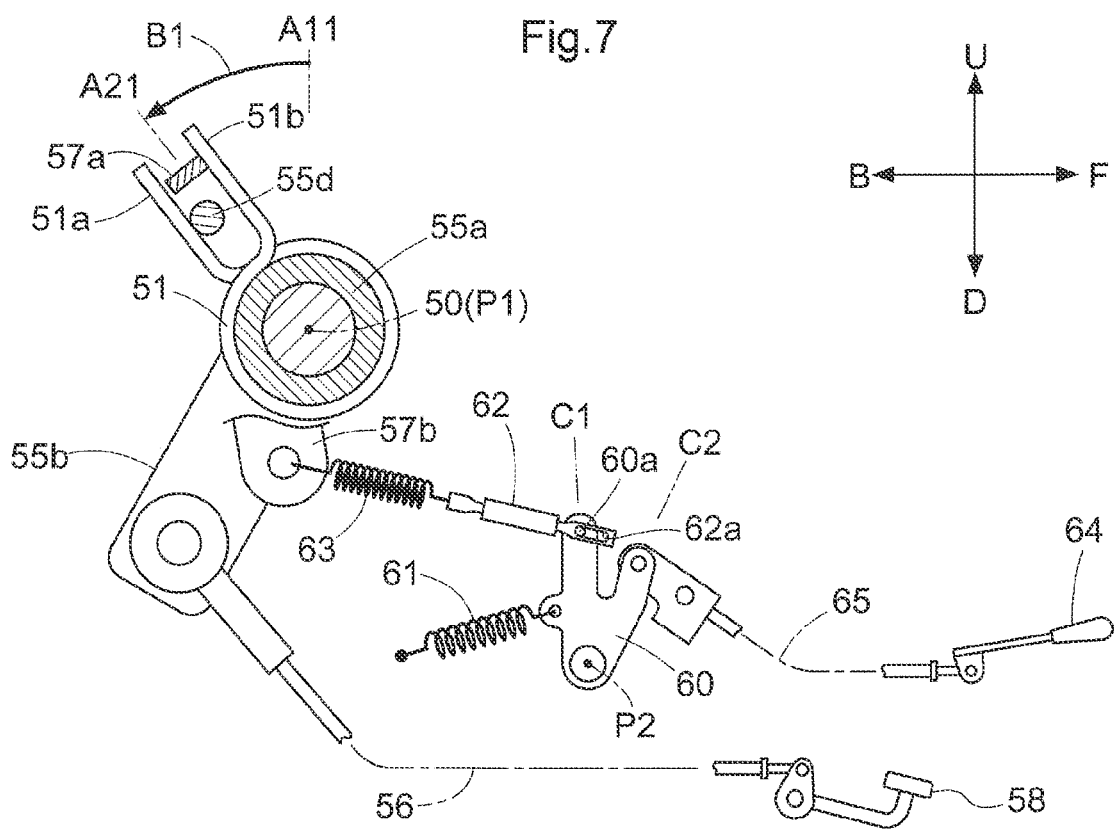
FIG. 7 is a right-side view showing a state in which the diff-lock pedal is foot-operated from the state shown in FIG. 5.

Then, when the meshing sections 48a of the diff-lock section 48 become in phase with the recessed sections 46a of the bevel gears 46, the diff-lock operation shaft 50 is rotated to the first direction B1 to the lock rotation position A21, via the end portion 51b of the first coil spring 51 and the receiving section 57a of the boss section 57, due to the spring force of the first coil spring 51, as shown from FIG. 6 to FIG. 7.

The fork section 53 and the boss section 54 are thereby moved rightward against the biasing force of the second coil spring 52, the diff-lock section 48 is operated to the lock position A2 by the fork section 53, and the rear wheel differential 31 is locked, as shown FIG. 4 and described above in "Configuration of diff-lock operation shaft, fork section and second coil spring".

If the meshing sections 48a of the diff-lock section 48 are in phase with the recessed sections 46a of the bevel gears 46 when the diff-lock pedal 58 is foot-operated, the diff-lock operation shaft 50 is rotated to the first direction B1 without delay via the first coil spring 51, and the state transitions from FIG. 5 to FIG. 7 without passing through the state shown in FIG. 6, thus locking the rear wheel differential 31.

In response to the diff-lock operation shaft 50 being rotated to the lock rotation position A21 as described above, the third coil spring 63 and the linking rod 62 are pushed toward the brake operation section 60 via the arm 57b of the boss section 57, as shown in FIG. 7.

In this case, the brake operation section 60 is kept at the release position C1 by the spring 61, due to the operation of the third coil spring 63 and the linking rod 62 is absorbed by the flexible function of the flexible section 62a of the linking rod 62, and the third coil spring 63 does not act as resistance to the rotation of the diff-lock operation shaft 50 to the lock rotation position A21.

In response to the diff-lock pedal 58 being released from the operated state, the diff-lock device 48 is operated to the operating position A1 by the biasing force of the second coil spring 52, the diff-lock operation shaft 50 is rotated in the second direction B2 to the operating rotation position A11, and the rear wheel differential 31 becomes operational, as shown from FIG. 7 to FIGS. 4 and 5 and described above in "Configuration of diff-lock operation shaft, fork section and second coil spring".

Operation of Diff-Lock Operation Shaft and Parking Brake by Parking Brake Lever

The wire 65 is pulled toward the parking brake lever 64 in response to the parking brake lever 64 being operated, as shown from FIG. 5 to FIG. 8, in a state where the diff-lock section 48 is in the operating position A1 and the diff-lock operation shaft 50 and the linking member 55 are in the operating rotation position A11, as shown in FIGS. 4 and 5.

The brake operation section 60 is thereby operated to the braking position C2 against the biasing force of the spring 61, the parking brake 41 is operated to the braking state, and the linking rod 62 is pulled toward the brake operation section 60, as described above in "Configuration relating to linkage of diff-lock operation shaft and parking brake lever".

In this case, as shown in FIG. 4 and described above in "Rear wheel differential", when the meshing sections 48a of the diff-lock section 48 cannot be inserted into the recessed sections 46a of the bevel gears 46 (diff-lock section 48 cannot be operated to lock position A2) due to the meshing sections 48a of the diff-lock section 48 being out of phase with the recessed sections 46a of the bevel gears 46, the diff-lock operation shaft 50 (receiving section 57a and arm 57b of boss section 57) is kept at the operating rotation position A11, as shown in FIG. 8.

In response, the third coil spring 63 is extended, as shown in FIG. 8, by the coupled rod 62 being pulled, and the third coil spring 63 stores the spring force.

Then, when the meshing sections 48a of the diff-lock section 48 become in phase with the recessed sections 46a of the bevel gears 46, the third coil spring 63 contracts due to the spring force of the third coil spring 63, and the diff-lock operation shaft 50 (receiving section 57a and arm 57b of boss section 57) is rotated in the first direction B1 to the lock rotation position A21, as shown from FIG. 8 to FIG. 9.

As shown FIG. 4 and described above in "Configuration of diff-lock operation shaft, fork section and second coil spring", the fork section 53 and the boss section 54 are moved rightward against the biasing force of the second coil spring 52, and the diff-lock section 48 is operated to the lock position A2 by the fork section 53, thereby locking the rear wheel differential 31.

If the meshing sections 48a of the diff-lock section 48 are in phase with the recessed sections 46a of the bevel gears 46 when the parking brake lever 64 is operated, the diff-lock operation shaft 50 is rotated in the first direction B1 without delay via the third coil spring 63, and the state transitions from FIG. 5 to FIG. 9 without passing through the state shown in FIG. 8, thus locking the rear wheel differential 31.

In response to the diff-lock operation shaft 50 (receiving section 57a and arm 57b of boss section 57) being rotated to the lock rotation position A21 as described above, the receiving section 57a of the boss section 57 separates from the end portion 51b of the first coil spring 51, and the boss section 57 is rotated to the lock rotation position A21, as shown in FIG. 9.

The linking member 55 and the first coil spring 51 are kept at the operating rotation position A11 due to the rotation of the diff-lock operation shaft 50 (receiving section 57a and arm 57b of boss section 57) not being transmitted to the first coil spring 51, and the first coil spring 51 thereby does not act as resistance to the rotation of the diff-lock operation shaft 50 to the lock rotation position A21.

Even if the first coil spring 51 was rotated to the lock rotation position A21 with the rotation of the diff-lock operation shaft 50 (receiving section 57a and arm 57b of boss section 57), the end portion 51a of the first coil spring 51 would separate from the abutting section 55d of the linking member 55 toward the lock rotation position A21, thus resulting in the linking member 55 being kept at the operating rotation position A11.

In response to the parking brake lever 64 being released, the diff-lock section 48 is operated to the operating position A1 by the biasing force of the second coil spring 52, and the diff-lock operation shaft 50 is rotated in the second direction B2 to the operating rotation position A11, as shown from FIG. 9 to FIGS. 4 and 5 and described above in "Configuration of diff-lock operation shaft, fork section and second coil spring", and the rear wheel differential 31 becomes operational. At the same time, the brake operation section 60 is operated to the release position C1 by the spring 61, and the parking brake 41 is released.

First Alternative Embodiment of Invention

In the first coil spring 51, the linking member 55 and the boss section 57, the end portion 51a of the first coil spring 51 may be coupled to the abutting section 55d of the linking member 55, and the end portion 51b of the first coil spring 51 may abut the receiving section 57a of the boss section 57.

According to this configuration, in response to the diff-lock operation shaft 50 being rotated to the lock rotation position A21, as described above in "Operation of diff-lock operation shaft and parking brake by parking brake lever", the receiving section 57a of the boss section 57 separates from the end portion 51b of the first coil spring 51 toward the lock rotation position A21.

Second Alternative Embodiment of Invention

In the first coil spring 51, the linking member 55 and the boss section 57, the end portion 51a of the first coil spring 51 may abut the abutting section 55d of the linking member 55, and the end portion 51b of the first coil spring 51 may be coupled to the receiving section 57a of the boss section 57.

According to this configuration, in response to the diff-lock operation shaft 50 being rotated to the lock rotation position A21, as described above in "Operation of diff-lock operation shaft and parking brake by parking brake lever", the first coil spring 51 is rotated to the lock rotation position A21, and the end portion 51a of the first coil spring 51 separates from the abutting section 55d of the linking member 55 toward the rotation position A21.

Third Alternative Embodiment of Invention

The diff-lock pedal 58 may be connected to the arm 57b of the boss section 57 via the third coil spring 63 and the wire 56, and the linking rod 62 may be connected to the arm 55b of the linking member 55.

The diff-lock pedal 58 is thereby linked to the diff-lock operation shaft 50 via the third coil spring 63 (flexible spring), and the parking brake lever 64 is linked to the diff-lock operation shaft 50 via the first coil spring 51 and the linking member 55.

Fourth Alternative Embodiment of Invention

Figure 10:
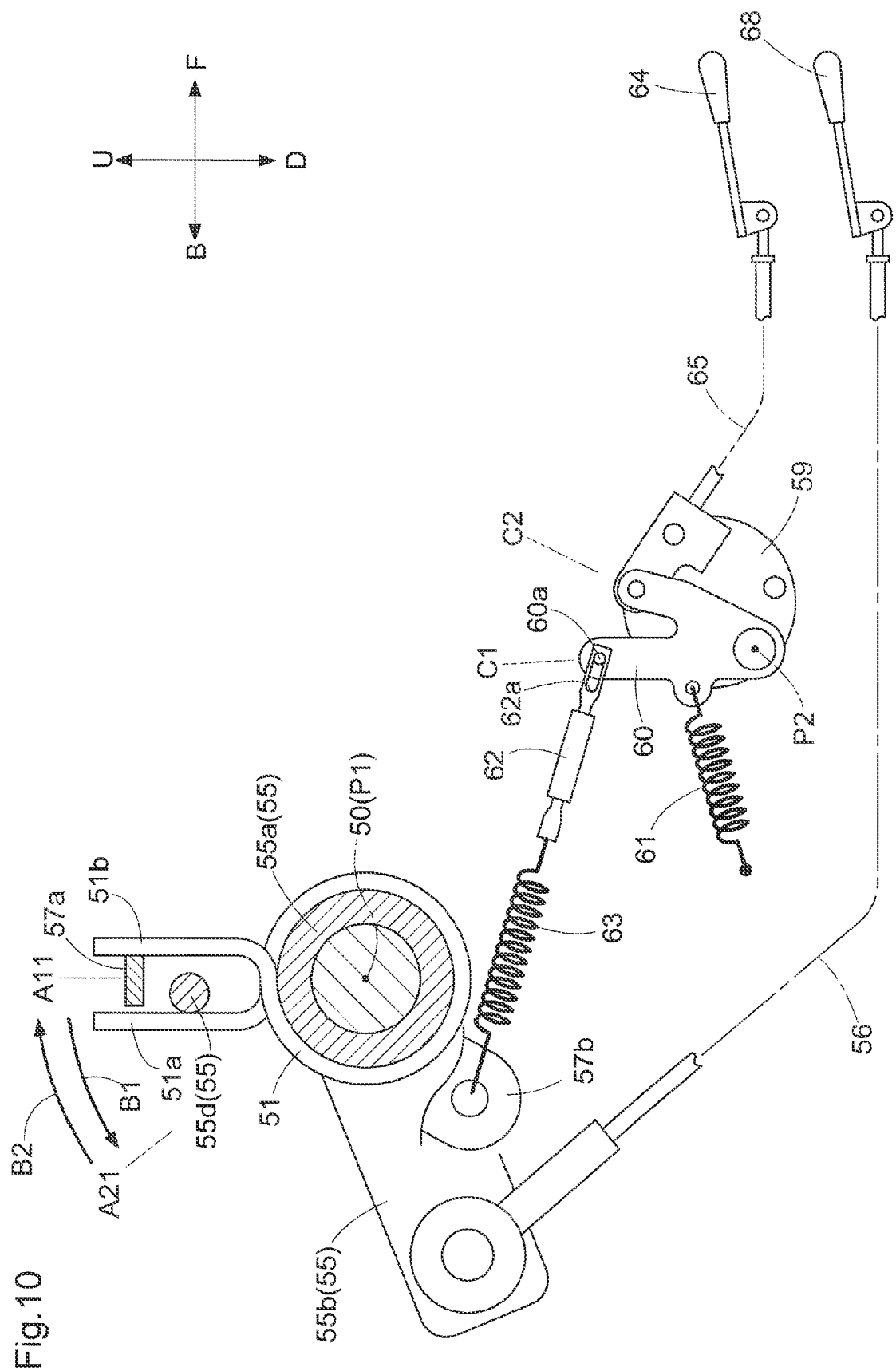
FIG. 10 is a right-side view showing a linked state of the diff-lock operation shaft with the diff-lock lever and the parking brake lever in a fourth alternative embodiment of the invention.

In the configuration shown in FIGS. 5 to 9, a manually operable diff-lock lever 68 (corresponds to diff-lock operation tool/manual operation tool) may be provided instead of the diff-lock pedal 58, and the wire 56 may be connected to the diff-lock lever 68, as shown in FIG. 10.

Fifth Alternative Embodiment of Invention

In the configuration shown in FIGS. 5 to 10, a manually operable parking brake pedal (not shown; corresponds to brake operation tool/manual operation tool) may be provided instead of the parking brake lever 64, and the wire 65 may be connected to the parking brake pedal.

Sixth Alternative Embodiment of Invention

The diff-lock portion 48 may be provided in the right section of the rear wheel differential 31, and the parking brake 41 may be provided in the left section of the transmission shaft 29.

According to this configuration, the fork section 53 and the boss section 54 need only be provided in the right section of the diff-lock operation shaft 50, and the boss section 57, the linking member 55 and the first coil spring 51 need only be provided on a portion of the diff-lock operation shaft 50 protruding on the left externally from the transmission case 11.

Seventh Alternative Embodiment of Invention

A crawler travel device (not shown) may be mounted on the body 3 as the travel device, instead of the front wheels 1 and the rear wheels 2.

An electric motor (not shown) may be installed in the body 3 as the motor section, instead of the engine 9.

The present invention can be applied not only to multipurpose work vehicles but also to ride-on mowers, tractors and the like.

DESCRIPTION OF REFERENCE SIGNS

2 Rear wheel (travel device)
9 Engine (motor section)
11 Transmission case (case)
31 Rear wheel differential (differential)
41 Parking brake
48 Diff-lock section
49 Diff-lock device
50 Diff-lock operation shaft
51 First coil spring
52 Second coil spring
51a End portion
51b End portion
53 Fork section
54a Cam section
55 Linking member
56 Wire (linking member)
58 Diff-lock pedal (diff-lock operation tool/manual operation tool)
63 Third coil spring (flexible spring)
64 Parking brake lever (brake operation tool/manual operation tool)
68 Diff-lock lever (diff-lock operation tool/manual operation tool)
A1 Operating position
A2 Lock position
P1 Axis

What is claimed is:

1. A work vehicle comprising:
right and left travel devices;
a differential configured to distribute power from a motor section to the right and left travel devices;
a diff-lock section operable to an operating position in which the differential is operational and a diff-lock position in which the differential is locked;
a diff-lock device configured to operate the diff-lock section to the operating position and the diff-lock position;
a case housing the differential, the diff-lock section and the diff-lock device;
a diff-lock operation tool configured to be manually operated;
a linking member connected between the diff-lock device and the diff-lock operation tool,
a parking brake provided in a transmission system from the motor section to the differential;
a brake operation tool configured to operate the parking brake to a braking state by being manually operated and
a flexible spring connected between the linking member and the brake operation tool,
wherein-the diff-lock device includes:
a diff-lock operation shaft supported by the case in such a manner as to be rotatable around an axis of the diff-lock operation shaft, and configured to operate the diff-lock section to the diff-lock position by being rotated; and
a first coil spring wound around an outer surface of the diff-lock operation shaft concentrically with the diff-lock operation shaft, and linked at one end portion to the diff-lock operation shaft and at another end portion to the linking member, and
the first coil spring is wound around the outer surface of a portion of the diff-lock operation shaft protruding externally from the case,
the one end portion and the other end portion of the first coil spring are respectively linked to the diff-lock operation shaft, outside the case,
due to the diff-lock operation tool being operated, the first coil spring is twisted around the axis via the linking member, and the diff-lock operation shaft is rotated via the first coil spring, and
due to the brake operation tool being operated, the first coil spring is twisted around the axis via the flexible spring and the linking member, and the diff-lock operation shaft is rotated via the first coil spring.

2. The work vehicle according to claim 1,
wherein, in at least one of a portion where the one end portion of the first coil spring is linked to the diff-lock operation shaft and a portion where the other end portion of the first coil spring is linked to the linking member, the linked sections become separated from each other in response to the diff-lock operation shaft being rotated by the one of the diff-lock operation tool and the brake operation tool being operated.

3. The work vehicle according to claim 1,
wherein the diff-lock operation shaft extends to one of left and right sides and to another of the left and right sides with respect to a left-right center of the differential, and
wherein a portion of the diff-lock operation shaft on the one of the left and right sides and a portion of the diff-lock operation shaft on the other of the left and right sides are rotatably supported by the case.

4. The work vehicle according to claim 3,
wherein the diff-lock device comprises:
- a fork section attached to the portion of the diff-lock operation shaft on the one of the left and right sides in such a manner as to be movable along the axis, and engaging with the diff-lock section;
- a cam section configured to, in response to the diff-lock operation shaft being rotated, transmit the rotation of the diff-lock operation shaft to the fork section and move the fork section such that the diff-lock section is operated to the diff-lock position; and
- a second coil spring wound around the outer surface of the diff-lock operation shaft concentrically with the diff-lock operation shaft to span from the fork section to the portion on the other of the left and right sides of the diff-lock operation shaft, and biasing the fork section such that the diff-lock section is operated to the operating position.

\* \* \* \* \*